United States Patent
Michelet et al.

(10) Patent No.: US 6,845,277 B1
(45) Date of Patent: Jan. 18, 2005

(54) HARDWARE MONITORING PROCESS HAVING ON SCREEN DISPLAY CAPABILITY

(75) Inventors: Jacques Michelet, Claix (FR); Claus Hirzmann, Saint Ismier (FR); François Loison, Grenoble (FR); Vincent Nguyen-Quang Do, Saint Martin d'Hères (FR)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/528,524

(22) Filed: Mar. 20, 2000

(30) Foreign Application Priority Data

Nov. 5, 1999 (EP) ............................................. 99410153

(51) Int. Cl.[7] .............................................. G05B 15/00
(52) U.S. Cl. ............................. 700/83; 700/2; 700/17; 714/25; 714/48; 714/55; 713/340; 702/183; 702/185; 702/186
(58) Field of Search ............................... 700/2, 83, 17; 714/25, 48, 55; 713/340; 702/183, 185, 186, 63–65; 710/113, 114, 45; 345/594, 618, 116, 764

(56) References Cited

U.S. PATENT DOCUMENTS

| | | | |
|---|---|---|---|
| 4,270,145 A | | 5/1981 | Farina |
| 4,689,740 A | | 8/1987 | Moelands et al. |
| 5,583,491 A | * | 12/1996 | Kim ....................... 340/825.72 |
| 5,598,542 A | | 1/1997 | Leung .......................... 710/45 |
| 5,621,662 A | * | 4/1997 | Humphries et al. ......... 700/276 |
| 5,631,698 A | * | 5/1997 | Lee .............................. 348/178 |
| 5,670,972 A | * | 9/1997 | Kim ............................ 345/13 |
| 5,703,629 A | | 12/1997 | Mermelstein et al. ....... 345/211 |
| 5,768,612 A | * | 6/1998 | Nelson ......................... 712/32 |
| 5,812,390 A | | 9/1998 | Merkin ......................... 700/2 |
| 5,901,297 A | | 5/1999 | Fisch et al. ................. 710/113 |
| 5,956,022 A | * | 9/1999 | Cheng ......................... 345/213 |

OTHER PUBLICATIONS

"HP MaxiLife: for the Highest Productivity and Reliability," Hewlett–Packard Company, pp. 1–5, 1998.

"VESA Display Data Channel Command Interface (DDC/CI) Standard," Video Electronics Standards Association, pp. 1–43, 1997–1998.

* cited by examiner

Primary Examiner—Anthony Knight
Assistant Examiner—Thomas Pham

(57) ABSTRACT

Process and apparatus for communication between an Information Handling System (HIS) and a display having On "Screen Display" (OSD) capability. The HIS system includes a processor under control of an operating system, a graphics system and an electronic circuit which operates independently on the processor and the graphics system. The display receives a graphics channel with the graphics signals. An additional service channel is used for the interaction between the host and the display, and also for allowing the independent electronic circuit to have a direct access to the On Screen Display capability of the display. The service channel may be advantageously a DDC/CI communication link, and the electronic circuit may be a hardware monitoring circuit which is operational even before the booting process of the processor. No additional Liquid Crystal Display is thus required.

32 Claims, 3 Drawing Sheets

HARDWARE MONITORING PROCESS HAVING ON SCREEN DISPLAY CAPABILITY

TECHNICAL FIELD OF THE INVENTION

The invention relates to computer and other information handling systems that have hardware monitoring systems, or other circuitry that is operable independently of the main processing functionality of the system, and that require display capability.

BACKGROUND ART

The complexity of personal computers and, more generally, the level of sophistication attained by the Information Handling System (I.H.S.) technology has called for an increasing need for maintenance and hardware failure prevention.

Hardware monitoring systems have been developed to achieve that goal. Generally speaking a hardware monitoring system is based on the use of a specific hardware circuit—including different sensors and detecting devices which may be under control of a microcontroller—the function of which is to centralize the information provided by the sensors and reporting it to a display device. The span of monitoring may vary in accordance with the requirements of the manufacturer of the IHS system, but may cover a wide range of internal components and operating parameters, such as the rotation speed of the fan(s), the voltage of the power supply, or the internal temperature of the machine.

In order to improve the efficiency of the hardware monitoring system, the latter is generally powered-on before the general power-on of the machine. For that purpose, the hardware monitoring circuit directly receives power when the cable is plugged in the power plug, and even if the main ON/OFF switch remains switched off. The hardware monitoring system is therefore fully operational when a user decides to switch on the machine, resulting in the starting process and particularly the booting of the processor.

The powering on of the hardware monitoring system independently of the main machine has proved to be very effective in order to report information during the pre-operational phase of the machine, i.e. when the latter has not completed its booting process, or even when the process has failed.

The HP Kayak PC Workstations, for instance, include a hardware monitoring system that reports information to the user by means of a specific Liquid Crystal Display (LCD) for displaying the information which is fed back by the monitoring microcontroller. Thus basic information can be provided to the user regarding the essential hardware features: the version of the Basic Input Output System (BIOS), the configuration of the memory, and the different parameters which are checked by the microcontroller. To achieve this, the microcontroller communicates with the sensors and detectors, but also with the LCD display, by means of a serial bus, such as the System Management Bus (SMB) complying, for instance, with the well known $I^2C$ reference protocol devised by Philips Corp. The hardware monitoring features of the HP Kayak PC workstations can be found described in a white paper entitled "HP Maxilife: for the Highest Productivity and Reliability" that has been made available by Hewlett-Packard Company.

The present invention is directed to enhancing the information which can be reported to the user by the hardware monitoring system and that is inevitably hindered by the limited size and resolution of the conventional LCD display.

Since personal computers in particular are relatively low cost items, such a monitoring system should require as few PC modifications or additions as possible in accomplishing the above, so as to minimise cost and parts count.

SUMMARY OF THE INVENTION

In brief, these objects are achieved by the process for communication between an Information Handling System (IHS) and at least one display having On Screen Display (OSD) capability in accordance with the present invention. The IHS system includes a processor under control of an operating system, a graphics system and an electronic circuit which operates independently of the processor and the graphics system. The display(s) receives a graphics channel with the graphics signals. An additional service channel is used for the interaction between the host and the display(s). The service channel can be used either by the processor under control of the operating system, for allowing the software control of the display(s), but also for conveying specific On Screen Display (OSD) commands from the electronic circuit for the purpose of controlling the OSD process for display texts and/or graphics on the screen independently of the processor and the operating system.

This results in the substantial advantage that the OSD capabilities of the display can be used independently of the working of the main processor, and particularly during the booting phase of the latter and even when the booting is doomed to fall. With the invention, the conventional screen or display thus becomes available even if the graphics system is not activated by the operating system.

In one embodiment of the invention, the internal circuit constitutes a hardware monitoring circuit which is under control of a microcontroller and which monitors different parts and subparts of the IHS system. Preferably, the hardware monitoring circuit receives power independently from the power-on of the main processor, so that monitoring is fully operational during the booting process of the main processor.

In one preferred embodiment of the invention, the service channel used by the graphics system consists of a bi-directionnal $I^2C$ communication supporting DDC/CI communication between the processor and the display, as well as a On Screen Display communication on a System Management Bus communication between the hardware monitoring circuit and the display.

In one particular embodiment of the invention, the graphics system is located on the main motherboard or, alternatively in an AGP or PCI card which is plugged into the motherboard, respectively via an AGP or PCI slot.

The invention also provides an IHS system comprising a graphics systems allowing a service channel with at least one display having On Screen Display (OSD) capability. The display(s) include(s) first receiving means for receiving a graphics channel with the graphics signals and second receiving means for receiving a service channel allowing interaction between the display(s) and the operating system. The service channel, such as a $I^2C$ communication link, permits the electronic circuit to have a direct access to the On Screen Display function, for displaying text and/or graphics independently of the operating system, while the service channel also provides a support for DDC/CI communication for the interaction between the processor and the display.

Particularly, in one embodiment, the graphics system includes a graphics engine, which may be located either on an AGP or PCI card, or even on the motherboard, and which generates the graphics signals to the display. In addition, the graphics engine issues a first I²C communication channel which complies to DDC/CI protocol for controlling the display. An arbitration mechanism has a first input connected to receive the first I²C communication channel of the graphics engine, and a second input which receives a second I²C communication channel which is provided by the hardware monitoring circuit, for instance. The arbitration mechanism operates in such a way as to prevent contention between the two I²C communication channels by ensuring that each I²C transaction be completed before giving the access to the other channel.

In one embodiment, the arbitration mechanism and the graphics system may be embedded into the same ASIC chip, provided that, in this case, that the former receives a stand-by power current for ensuring full operation when the machine is switched on.

It can therefore be seen that the invention provides an improved display having On Screen Display capability for the attachment to a IHS system or a host computer including a processor, a graphics system and an electronic circuit, such as a hardware monitoring system, which operates independently of the processor and the graphics system. The display comprises a graphics channel for receiving the graphics signals generated by the graphics system and a service channel allowing interaction between the display and said operating system. The display includes means for detecting, into the service channel, specific On Screen Display commands which may be issued by the hardware monitoring system, for instance, for controlling the On Screen Display capability.

DESCRIPTION OF THE DRAWINGS

Embodiments of the invention will now be described, by way of example only, with reference to the accompanying drawings, wherein.

DESCRIPTION OF THE PREFERRED EMBODIMENT OF THE INVENTION

Figure 1:
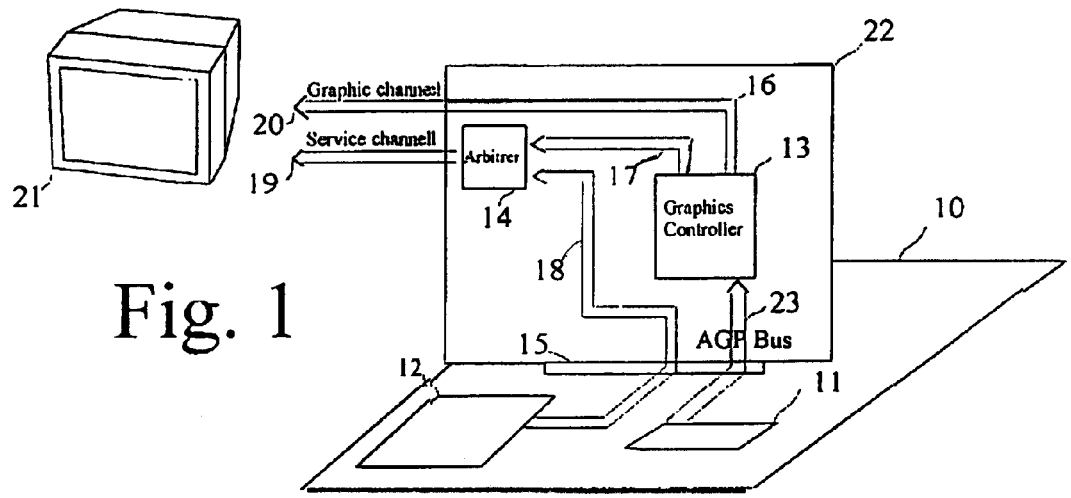
FIG. 1 shows a first embodiment of the invention where the graphics system is located on a AGP or PCI graphics card.

FIG. 1 shows the preferred embodiment of the invention. A motherboard 10 includes a main processor 11 which is under control of an operating system, such as Windows 95/98 marketed by Microsoft Corp., OS/2 marketed by IBM Corp., or LINUX for instance.

Figure 2:
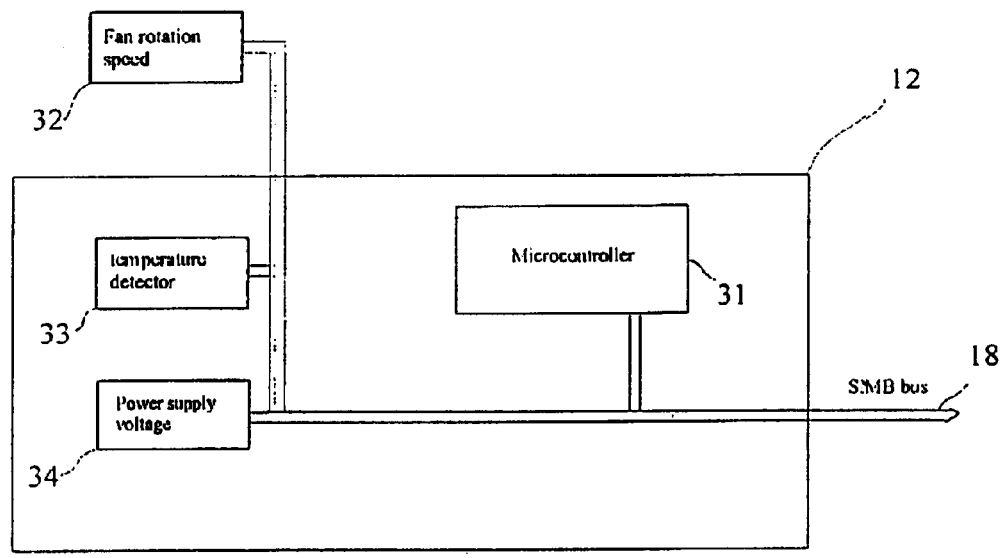
FIG. 2 illustrates the hardware monitoring circuit 12 using the embodiment of FIG. 1.

An electronic circuit 12 is embodied on the motherboard and operates independently of the main processor 11 and the operating system. In the preferred embodiment, circuit 12 consumes a hardware monitoring circuit, illustrated in FIG. 2, and whose purpose is to check the configuration and operating conditions of particular areas or elements within the machine, such as the memory configuration, the BIOS version, or any other information and feedback relating to essential hardware and software features. For that purpose, hardware monitoring circuit 12 includes a microcontroller 31 and a set of sensors or detectors 32, 33 and 34, illustrated in FIG. 2, which are dedicated to checking and monitoring particular areas or components within the machine. The sensors may be internal to the main Board—which is for instance the case of temperature detector 33 and power-supply detector 34—but they may be also external to the main board 10, e.g. fan rotation speed sensor 32 for instance. Elements 32–33 and 34 communicate with microcontroller 31 via a two-wire bus 18 consisting, for instance, of a System Management Bus (SMB) serial protocol complying with the I²C serial protocol.

Hardware monitoring circuit 12 operates independently of the main processor 11 and independently of the operating system. It may particularly be arranged in order to directly receive power when the power cable is plugged in a power plug, so that is receives a stand-by current and is fully operational for monitoring the essential elements during the first instants of the execution of the BIOS instructions as well as the booting process. While the hardware monitoring circuit 12 takes place on the motherboard, it will be understood that, in some circumstances, it will be more appropriate to locate this circuit elsewhere in the host, and even in the network with the perspective of developing a function known as "alert on Local Area Network'. In this case, the network is powered on with its own power supply being independent of the power supply of the host computer.

In the following description, the example of a hardware monitoring circuit 12 being located on the motherboard 10 will be considered.

The IHS system further includes a graphics system which may be embodied into a graphics card 22, as shown in the FIG. 1 again. Graphics card 22 may be, for instance, a PCI graphics card or anAGP card. For the sake of clarity, the description will refer to an AGP card, while it is clear that the design can be readily adapted to suit the PCI format, if required. AGP card 22 is plugged into a corresponding AGP slot 15 which is available on mother board 10. AGP slot 15 includes the 30-conductor AGP bus 23 for conveying the graphics images, the bitmaps and the graphics control commands issued by processor 11 under control of the operating system. In addition to the AGP bus, the AGP slot 15 further includes two specific wires which are reserved for the connection of a service channel, and particular a serial bus 18 which is under control of microcontroller 21 of hardware monitoring system as will be hereinafter explained in more detail.

The graphics system further includes a graphics controller or engine 13 within graphics card 22 which produces the graphics signals in accordance with the bitmaps or graphical commands received by the processor 11 via the AGP bus. Graphics controller 13 generally takes the form of a specialized integrated circuit, such as an ASIC chip, and which provides the control of one or more screens or displays. FIG. 1 illustrates the control of one conventional Cathode Ray Tube (CRT) display 21, but it is clear that graphics controller 13 can also be used for controlling different types of displays and different types of signals: flat panels, such as LCD screens, Thin Flat Transistors (TFT) displays.

Graphics controller 13 is generally embodied by means of a ASIC graphics engine, such as an MCG G200 for instance, which is marketed by Matrox Corp. The graphics engine comprises a frame buffer which comprises, at each time, a bitmap view of the image being displayed on the screen. The size of the word which is contained in that frame buffer depends on the depth of the color which is desired in the configuration being considered. Graphics controller or engine 13 has two functions. A first function consists in the building of the image which is stored in the frame buffer in accordance with the bitmap or graphics control information provided by AGP bus 23. Further, graphics controller 13 uses the contents of the frame buffer for generating the graphics signals which depend upon the nature of the display 21. In the case of a CRT display, for instance, a RAMDAC is used for generating the three analog colors and the synchronization signals, as known by the skilled man. If the graphics controller is designed to control a digital display, then the graphics signals are directly derived from the contents of the frame buffer in order to control the digital display.

Display 21 receives the graphics channel issued by the graphics controller 13 on a bus 20 carrying the above mentioned graphics signals. In a CRT screen as represented in the figure, the graphics signals will comprise the analog signals, clearly the green, blue and red signals associated with the horizontal and vertical synchronization signals. In the case of a digital display, the graphics controller 13 will provide digital graphics signals accordingly in accordance with the particular digital format which is used. Two formats are traditionally used for coding the digital graphics signals, either the Time Multiplex Differential Signals (TMDS) or the Low Voltage Differential Signal (LVDS) well known in the art.

Display 21 also comprises "On Screen Display" capabilities which are controlled by an internal microcontroller (not shown) and which causes the display of foreground texts and/or graphics superimposed on the background displayed image which is under control of the graphics signals on bus 20. Generally speaking, the OSD capabilities are activated when the user presses down the control buttons located on the front panel of the display in order to control and adjust, for instance, the brightness, the contrast, the horizontal or vertical positions of the image which is being displayed, or any other correction useful for perfecting the image.

When combined with the action of the control buttons of the front panel, the OSD capabitlities enhance the ergonomic aspects of the manual control of the display.

The display 21 is arranged in such a way as to provide an independent control of the On Screen Display function, irrespective of the pressing down of the control buttons on the front panel. The Display 21 provides the OSD function as an independent feature which is used for providing a second channel for displaying text and/or graphics on the display independently of the graphics signals existing on graphics channel of bus 20 under control of processor 11.

Those independent OSD capabilities of display 21 are controlled by means of OSD commands which are received on a serial link service channel on bus 19 which is issued from the graphics card 22.

In one embodiment of the invention, that service channel is also used for providing control, in addition to the OSD functions as described above, of the other internal operating parameters of the monitor or display, but also optional annex devices. Such control may cover parameters such as contrast, brightness, or the like.

Clearly, any serial link or communication protocol could be used for realizing the service channel on bus 19. However, one can take advantage of a standard of communication link which is well established in the context of Plug-and-Play capability in order to automatically configure the graphics system in accordance with the capabilities of the attached screen. The serial communication link existing in this context is referred to as Display Data Channel (DDC) providing unidirectional service channel between the display and the graphics systems and, with the latest developments, the Display Data Channel Command Interface (DDC/CI) standard providing the a bidirectional serial communication link between the display and the graphics systems. This permits the processor 11 to issue control commands for controlling internal parameters of the display 21. As known in the art, the DDC/CI standard, resulting from the previous developments known under the designation DDC/2Bi, provides a two-wire serial communication link which is compatible with the well-known $I^2C$ protocol. The DDC/CI protocol deals with the possibility of controlling the monitor and optional annex devices. More details regarding this standard will be found in document 'Display Data Channel Command Interface (DDC/CI) Standard', issued by the Video Electronics Standards Association, 2150 North First Street, Suite 440, San Jose, Calif. 95131-2029. The DDC/CI standard enhances the former Display Data Channel (DDC) which formerly only provided the host—ie the processor 11 and the operating system—with information regarding the operating of the display. With the provision of the DDC/CI, the processor 11 on the main board, under control of the operating system, can emulate the $I^2C$ protocol on service channel bus 19 for transmitting DDC/CI commands for the purpose of controlling display 21 without requiring the manual use of the control buttons on the front panel.

The microcontroller inside the display 21 decodes the DDC/CI protocol on service channel bus 19 in order to extract the control commands to be applied to the display.

Improvements are brought to the set of known DDC/CI commands, by providing a suitable set of additional vendor specific commands, for allowing the control of OSD capabilities of the display 21. This new set of commands—OSD control commands—are embedded into the DDC/CI protocol. These commands have the purpose of controlling the OSD capability of the display 21, in order to display text information or graphics which are generated by microcontroller 31. The OSD control commands are decoded by the microcontroller of display 21 in order to activate the OSD functio With these new commands, the hardware monitoring circuit 12 gets a direct access, by issuing appropriate OSD control command to the display 21, so that text and/or graphics can be displayed independently of the processor 11 and the graphics controller 13. This direct access to the OSD function of display 21 can thus be used for providing an enhanced display and feedback means to report information relating to the BIOS version, the memory configuration, and essential hardware features and parameters even when the booting process has not been completed, and the graphics controller not activated.

More particularly, the control of OSD function of display 21 by hardware monitoring circuit 12 is achieved as follows:

Microcontroller 31 controls bus 18 in accordance with a System Management Bus standard which complies with the $I^2C$ protocol. The SMB control commands are transmitted, via the two reserved conductors of AGP slot 15 mentioned above, to a first input of an Arbitration circuit or arbiter 14 which is located into the graphics card 22, and whose purpose is to prevent any contention between the SMB channel provided by the hardware monitoring system and the DDC/CI channel issued by the graphics controller 13. Arbiter 14 has a second input which receives the DDC/CI service channel which is normally issued by graphics controller 13 and has an output which is connected to bus 19 for allowing the access of service channel of display 21 to one among the two SMB or DDC/CI communication links. Arbiter 14 operates independently on the graphics controller 13 and irrespective of its activation by the operating system. It is therefore fully operational during the first steps of the initialisation of the host, and particularly when processor 11 initiates the first test procedures, the execution of the first BIOS instructions, and the booting of the operating system. Arbiter 14 performs the arbitration between the I$^2$C flow of commands, either DDC/CI commands coming from bus 17 and the improved OSD control commands on SMB bus 18, so as to prevent any contention and to give only access to one I$^2$C transaction on service channel bus 19. This is made possible since both SMB bus 18 and the DDC/CI bus 17 share the same I$^2$C protocol, and thus, the same service channel on bus 19 can be used for either controlling display 21 by processor 11 or for controlling OSD capabilities of display 21 by hardware monitoring circuit 12.

As known in the art, different arbitration or steering logic mechanisms can be used for embodying arbiter 14 so as to provide to only one of busses 17 and 18 the access of the service channel on bus 19 as long as the processed I$^2$C protocol has not fully completed.

During the normal operating of the processor 11, when the operating system wishes to take control of the internal parameters of display 21, brightness for instance, graphics controller 13 receives on AGP bus appropriate commands from processor 11, and issues the corresponding DDC/CI commands on bus 17 which is transmitted to display 11 in accordance with the I$^2$C protocol. Processor 11 keeps the possibility to have a software control of the internal parameters of display 12 which were normally accessed by the manual action on the control buttons of the front panel.

However, since Arbiter 14 operates independently of the main processor 11, and the activation of the graphics controller 13, during or before the booting process of the operating system, hardware monitoring circuit 12 may issue OSD control commands on SMB bus 18 which are then transmitted to the first input of Arbiter 14. Therefore, an I2C transacion may be initiated and the microcontroller 31 of hardware monitoring circuit 12 gets an access to the service channel bus 19, so that the OSD commands issued by the processor 21 may be received by the microcontroller within the display, thanks to the I$^2$C protocol. The latter microcontroller can then decode the OSD commands which are issued by the hardware monitoring circuit 12, extract the text and/or graphics which is therein contained, and control the On Screen Display function in order to display them accordingly. Therefore, with this arrangement, the access of the OSD function of display 21 are available for the hardware monitoring circuit 12 even during the pre-operational phase of the booting process of the operating system, particularly before the graphics system is activated.

The hardware monitoring system gets access to the On Screen Display of display 21 which is independent of the working of the operating system, and can then report any information to the user which was previously reported by means of a Liquid Crystal Display (L.CD) of the prior art.

In one embodiment, the hardware monitoring may even be involved during the assembling of the different parts of the host computer, during the manufacturing process, and not only during the booting process of the computer at the user's home. Indeed, since the OSD capabilities of the display are available for producing text and/or graphics independently of the main processing system, the manufacturer of host equipment may use the large and convenient graphics display while the assembling of the different parts and components of the machine. In this case, circuit 12 carries out a more general hardware assembling and operating monitoring role.

Figure 3:
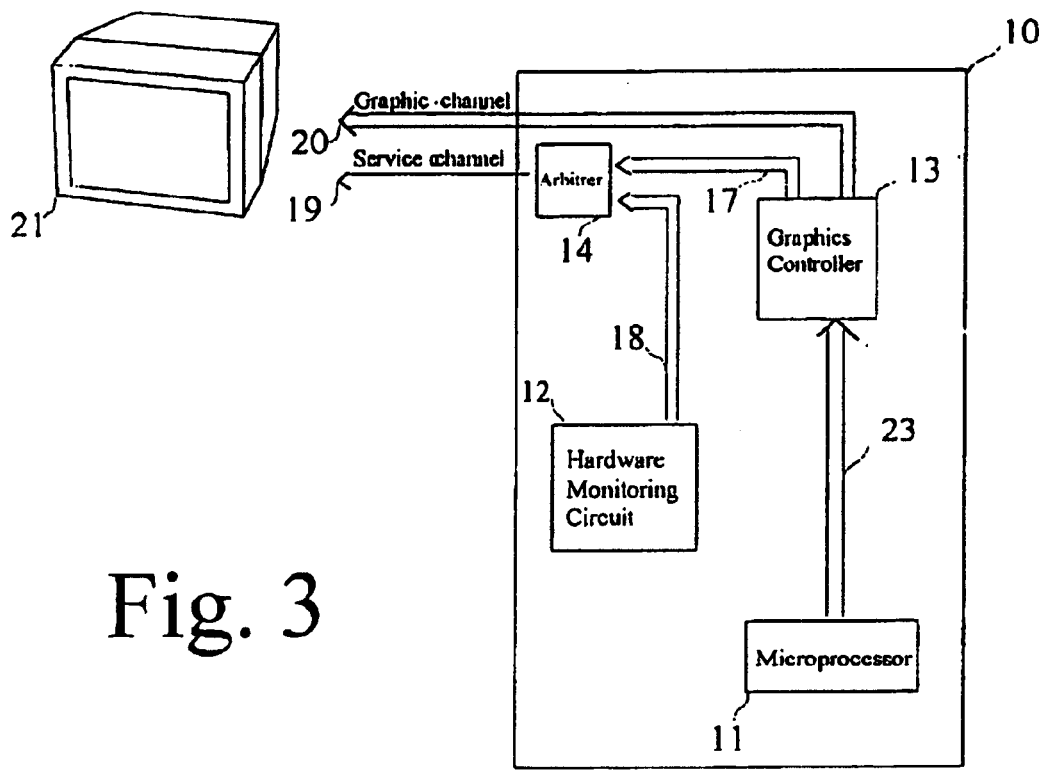
FIG. 3 is a second embodiment of the invention where the graphics system is directly located on the motherboard.

FIG. 3 illustrates a second embodiment of the graphics system which is located on the motherboard 10, for instance for a portable computer. In this case, no AGP slot is involved and the SMB bus can be directly connected to the Arbiter 14 which is also located on the motherboard 10. As above, the hardware monitoring circuit 12 gets direct access to the OSD function of display 21 which is independent of the processor 11 and the operating system.

It has been described above that Arbiter 14 is separate with respect to the graphics controller 13. This permits to use the graphics controllers which are known in the art, provided that a DDC/CI service channel is supported. In some circumstances, the use of a known graphics controller, embodying on a graphics card 22 realised in accordance the description above, allows the manufacturer to share a common design for graphics cards which may use or not the OSD control commands of display 21, and results in a reduction of manufacturing cost.

Figure 4:
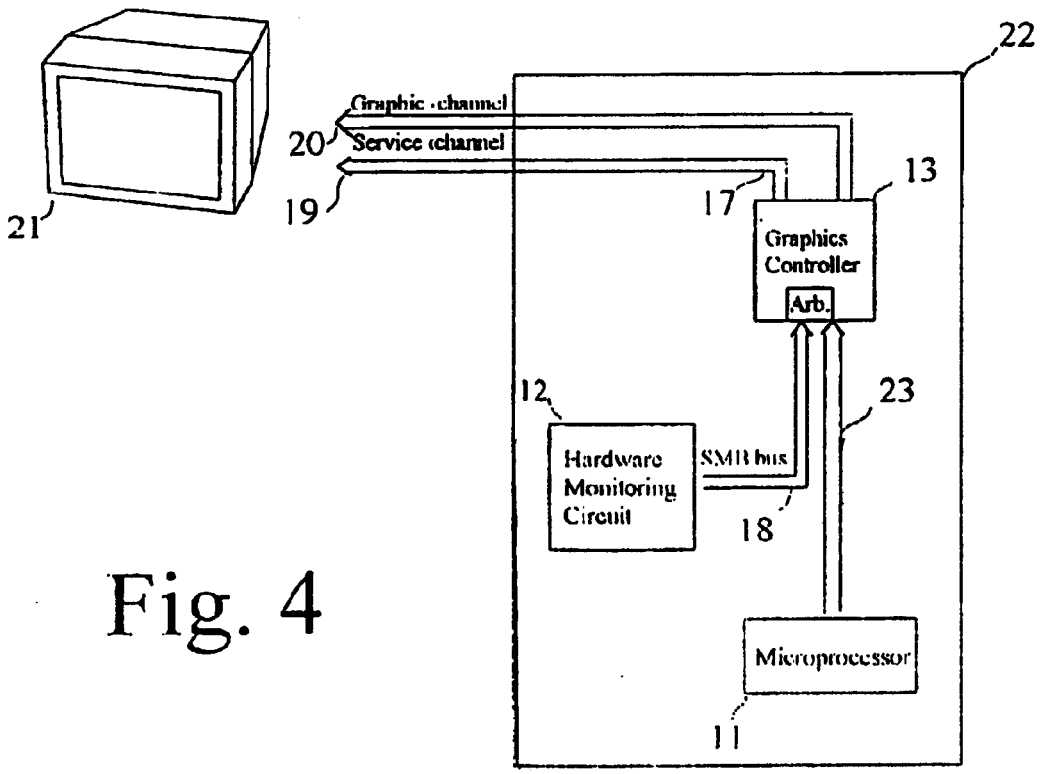
FIG. 4 shows a third embodiment of the invention where the arbitration circuit is embodied into the graphics ASIC circuit.

However, Arbiter 14—which has to be operational even when graphics controller 13 is not yet activated (because the booting process of processor 11 has not yet completed)—can be embodied into the ASIC chip. This specific arrangement is illustrated in FIG. 4 where it is shown that ASIC graphics controller 13 includes a specific area within the chip which embodies Arbiter 14 receiving both the DDC/CI commands generated by the processor 11 under control of the operating system, and the OSD commands which are independently generated by hardware monitoring circuit 12. It should be noted that, generally speaking, stand-by current exists in the graphics controller which can be used to power a predetermined set of functions. This stand-by current can be used for powering the arbitration mechanism within the ASIC, in the same way that hardware monitoring circuit 12 receives stand-by current.

FIG. 4 illustrates such a new concept of graphics engine in a single ASIC chip, which embodies the arbitration mechanism of circuit 14 for supporting the OSD control by hardware monitoring circuit 12 as well as the conventional DDC/CI commands issued by the processor 11. The graphics engine 13 comprises the traditional graphics engine receiving the AGP bus from the main processor and issuing the graphics channel to the display as well as serial I$^2$C service channel protocol for DDC/CI commands for allowing control of the display 21 by processor 11. An internal arbitration mechanism receives the latter I$^2$C protocol carrying the DDC/CI issued by the process as well as a second I$^2$C protocol serial link coming from an independent hardware monitoring circuit 12 on motherboard 10.

Figure 5:
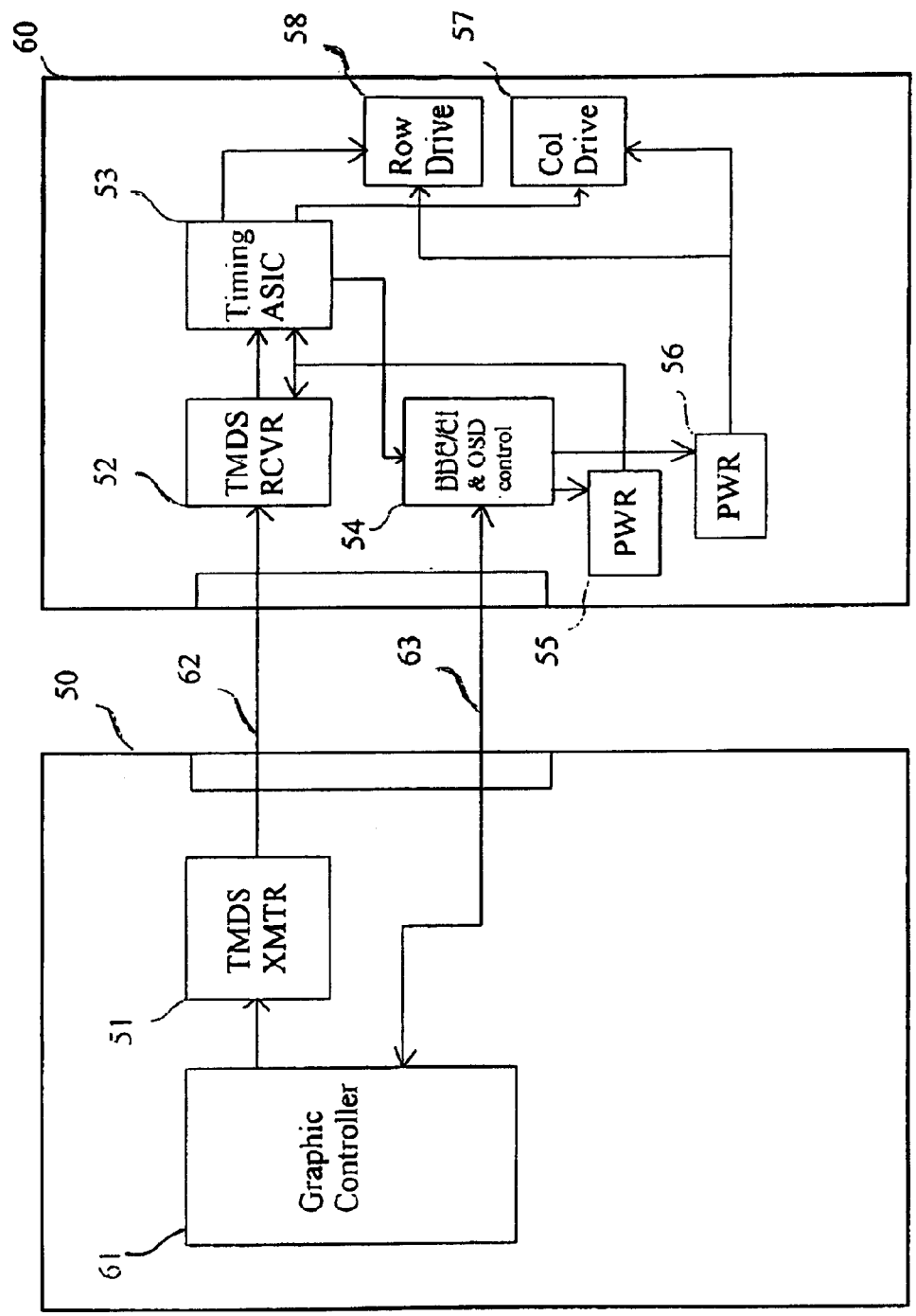
FIG. 5 shows the basic architecture of a digital display embodying the OSD controllable function in accordance with an embodiment of the invention.

FIG. 5 illustrates the adaptation of the embodiment of FIG. 4, for the control of a digital display 60. In this case, the graphics signals which are provided by graphics controller 61 in graphics card 50 are directly transmitted to the screen 60 in digital form, either in accordance with the Time Multiplex Differential Signal (TMDS) or the Low Voltage Differential Signal (LVDS). Considering a TMDS format for instance, each pixel is subject to one elementary processing: three serial channels are simultaneously used for processing each fundamental color (red, green and blue), bit by bit for each color. This is achieved by means of a TMDS transmitter (XMTR) 51 located in graphics card 50 which produces three serial flows on leads 62. In the digital display 60, a TMDS receiver (RCVR) 52 receives in parallel the three bits corresponding to each primary colour and successively reconstructs the full byte corresponding to each color. A Timing ASIC circuit 53 allows the extraction, for each pixel, of the corresponding value which can then be transmitted to control a Row drive circuit 58 and to a Column drive circuit 57 to cause display of the corresponding pixel with the appropriate color.

A DDC/CI and OSD control decoder 54 receives the I²C serial protocol link on a two-wire bus 63 which carries the DDC/CI commands issued by the processor and the OSD commands generated by an independent hardware monitoring circuit (not shown in FIG. 5). DDC/CI and OSD decoder 54 controls power circuits 55 and 56, and the latter particularly controls the Column drive circuit 57 and Row drive circuit 58 for causing the superimposition of the OSD text and/or graphics on the screen.

The invention was particularly described with reference to a hardware monitoring circuit which receives a direct access to the OSD functions of a display or a screen and which, therefore, can provide enhancedfeedback information about hardware conditions. However, it will be understood that any electronic circuitry providing other functions than hardware monitoring can take benefit from the teaching of the present invention.

What is claimed is:

1. Communication process between an Information Handling System (IHS) and at least one display having On Screen Display (OSD) capability; wherein said IHS system includes a processor under control of an operating system, a graphics system and an electronic circuit operating independently of said processor and said graphics system, said at least one display receives a graphics channel comprising the graphics signals generated by said graphics system and a service channel allowing interaction between said at least one display and said operating system;

the process being characterized in that said service channel is also used to permit said independent electronic circuit to have access to the On Screen Display (OSD) capability of said at least one display in order to display text and/or graphics independently of said processor and said operating system.

2. Process according to claim 1 characterized in that said service channel of said display consists of a bi-directional serial communication link which is compatible with the I²C protocol, providing either DDC or DDC/CI communication support with said operating system, as well as an I²C communication link between said independent electronic circuit and said at least one display in order to provide to said electronic circuit a direct access to the OSD capability of said at least one display.

3. Process according to claim 1 characterized in that said graphics system is either an AGP or PCI graphics card which is plugged into a corresponding AGP or PCI slot having at least two conductors being reserved for said I²C communication link conveying the OSD commands to be directed to said at least one display.

4. Process according to claim 2 characterized in that said electronic circuit consists of a hardware monitoring circuit displaying monitoring feedback information to the user via said service channel.

5. Process according to claim 4 characterized in that said hardware monitoring circuit is connected via a network to said IHS system in order to provide an alarm on Local Area Network (LAN) capability.

6. Information Handling System (IHS) comprising:

a processor arranged to operate under the control of an operating system, a graphics system and an electronic circuit operable independently of said processor;

at least one display having On Screen Display (OSD) capability and including first receiving means for receiving a graphics channel upon which graphics signals generated by said graphics system are transmitted, and second receiving means for receiving a service channel for allowing interaction between said at least one display and said operating system;

characterized in that said service channel and said display are arranged to permit said independent electronic circuit to access the On Screen Display (OSD) capability of said at least one display in order to display text and/or graphics independently of said processor and said operating system.

7. Information Handling System according to claim 6 characterized in that said service channel consists of a bi-directional serial communication link.

8. Graphics system for use in an Information Handling System (IHS) as defined in claim 6 characterized by:

a graphics engine for providing graphics signals to said graphics channel and a first I²C communication channel complying with the DDC/CI protocol for controlling said at least one display;

arbitration means having a first input connected to receive said first I²C communication channel provided by said graphics engine, and having a second input receiving a second I²C communication channel provided by said hardware monitoring circuit;

said arbitration means for providing arbitration between said first and said second I²C communication channels so that both hardware monitoring circuit and said processor can get access to said second receiving means of said at least one display without contention.

9. Information handling system as claimed in claim 7 wherein said serial communication link is compatible with the I²C protocol, and provides a DDC or a DDC/CI communication interface with said processor as well as a I²C communication link between said independent electronic circuit and said at least one display in order to provide to said electronic circuit a direct access to the OSD capability of said at least one display.

10. Information handling system according to claim 7 characterized in that said electronic circuit is a hardware monitoring circuit for displaying monitoring feedback information to the user via said service channel.

11. Graphics system for use in an Information Handling System (IHS) as defined in claim 7 characterized by:

a graphics engine for providing graphics signals to said graphics channel and a first I²C communication channel complying with the DDC/CI protocol for controlling said at least one display;

arbitration means having a first input connected to receive said first I²C communication channel provided by said graphics engine, and having a second input receiving a second I²C communication channel provided by said hardware monitoring circuit;

said arbitration means for providing between said first and said second I²C communication channels so that both hardware monitoring circuit and said processor can get access to said second receiving means of said at least one display without contention.

12. Graphics system according to claim 8 characterized in that said arbitration means are arranged to prevent the access of said service channel to one among said first and second I²C communication links until a preceding I²C transaction has been successfully completed.

13. Information Handling System according to claim 9 characterized in that said graphics systems includes:
   a graphics engine for providing graphics signals to said graphics channel and a first I²C communication channel complying with the DDC/CI protocol for controlling said at least one display;
   arbitration means having a first input connected to receive said first I²C communication channel provided by said graphics engine, and having a second input for receiving a second I²C communication channel provided by said hardware monitoring circuit;
   said arbitration means providing arbitration between said first and said second I²C communication links so that the hardware monitoring circuit and the processor can both get access to said second receiving means of said at least one display.

14. Graphics system for use in an Information Handling System (IHS) as defined in claim 9 characterized by:
   a graphics engine for providing graphics signals to said graphics channel and a first I²C communication channel complying with the DDC/CI protocol for controlling said at least one display;
   arbitration means having a first input connected to receive said first I²C communication channel provided by said graphics engine, and having a second input receiving a second I²C communication channel provided by said hardware monitoring circuit;
   said arbitration means for providing between said first and said second I²C communication channels so that both hardware monitoring circuit and said processor can get access to said second receiving means of said at least one display without contention.

15. Information Handling System according to claim 9 wherein said graphics systems comprises:
   a graphics engine for providing graphics signals to said graphics channel and a first I²C communication channel complying with the DDC/CI protocol for controlling said at least one display;
   arbitration means having a first input connected to receive said first I²C communication channel provided by said graphics engine, and having a second input for receiving a second I²C communication channel provided by said hardware monitoring circuit;
   said arbitration means providing arbitration between said first and said second I²C communication links so that the hardware monitoring circuit and the processor can both get access to said second receiving means of said at least one display.

16. Graphics system for use in an Information Handling System (IHS) as defined in claim 10 characterized by:
   a graphics engine for providing graphics signals to said graphics channel and a first I²C communication channel complying with the DDC/CI protocol for controlling said at least one display;
   arbitration means having a first input connected to receive said first I²C communication channel provided by said graphics engine, and having a second input receiving a second I²C communication channel provided by said hardware monitoring circuit;
   said arbitration means for providing between said first and said second I²C communication channels so that both hardware monitoring circuit and said processor can get access to said second receiving means of said at least one display without contention.

17. Information Handling System according to claim 13 characterized in that said graphics systems is an AGP or PCI graphics card which is plugged into a corresponding AGP or PCI graphics slot having at least two wires which are dedicated for the communication of said second I²C protocol communication channel.

18. Graphics system for use in an Information Handling System (IHS) as defined in claim 13 characterized by:
   a graphics engine for providing graphics signals to said graphics channel and a first I²C communication channel complying with the DDC/CI protocol for controlling said at least one display;
   arbitration means having a first input connected to receive said first I²C communication channel provided by said graphics engine, and having a second input receiving a second I²C communication channel provided by said hardware monitoring circuit;
   said arbitration means for providing between said first and said second I²C communication channels so that both hardware monitoring circuit and said processor can get access to said second receiving means of said at least one display without contention.

19. Information Handling System according to claim 15 wherein said graphics systems is an AGP or PCI graphics card which is plugged into a corresponding AGP or PCI graphics slot having at least two wires which are dedicated for the communication of said second I²C protocol communication channel.

20. Information Handling System according to claim 17 characterized in that said graphics system and said processor are located on the same motherboard.

21. Information Handling System according to claim 19 wherein said graphics system and said processor are located on a common motherboard.

22. Display device having On Screen Display (OSD) capability for use in an Information Handling System (IHS) including a processor under control of an operating system, a graphics system and an electronic circuit operating independently of said processor and said graphics system,
   said display having one or more connectors for receiving a graphics channel comprising graphics signals generated by said graphics system and a service channel allowing interaction between said display and said operating system;
   characterized by means responsive to commands in said service channel for controlling the On Screen Display capability independently of the operation of the processor and the operating system.

23. Display device according to claim 22 characterized in that said service channel consists of a bi-directional serial communication link which is compatible with the I²C protocol, and providing either DDC or DDC/CI communication with said operating system, as well as an I²C communication link between said independent electronic circuit and said display in order to provide to said electronic circuit a direct access to the OSD capability of said display.

24. Communication process between an Information Handling System (IHS) and at least one display having On Screen Display (OSD) capability; wherein
   said IHS system includes a processor under control of an operating system, a graphics system and an electronic circuit which is arranged so as to be able to function before said operating system has booted, said at least one display receives a graphics channel comprising the graphics signals generated by said graphics system and a service channel allowing interaction between said at least one display and said operating system;

the process being characterized in that said service channel is also used to permit said independent electronic circuit to have access to the On Screen Display (OSD) capability of said at least one display in order to display text and/or graphics before said operating system has booted.

25. The communication process according to claim 24 wherein said service channel of said display includes a bi-directional serial communication link which is compatible with the I²C protocol, providing either DDC or DDC/CI communication support with said operating system, as well as an I²C communication link between said independent electronic circuit and said at least one display in order to provide to said electronic circuit a direct access to the OSD capability of said at least one display.

26. The communication process according to claim 24 wherein said graphics system is either an AGP or PCI graphics card which is plugged into a corresponding AGP or PCI slot having at least two conductors being reserved for said I²C communication link conveying the OSD commands to be directed to said at least one display.

27. The communication process according to claim 25 wherein said electronic circuit includes a hardware monitoring circuit displaying monitoring feedback information to the user via said service channel.

28. Process according to claim 27 wherein said hardware monitoring circuit is connected via a network to said IHS system in order to provide an alarm on Local Area Network (LAN) capability.

29. Information Handling System (IHS) comprising:

a processor arranged to operate under the control of an operating system, a graphics system and an electronic circuit which is arranged so as to be able to function before said operating system has booted;

at least one display having On Screen Display (OSD) capability and including first receiving means for receiving a graphics channel upon which graphics signals generated by said graphics system are transmitted, and second receiving means for receiving a service channel for allowing interaction between said at least one display and said operating system;

wherein said service channel and said display are arranged to permit said independent electronic circuit to access the On Screen Display (OSD) capability of said at least one display in order to display text and/or graphics before said operating system has booted.

30. Information Handling System according to claim 29 wherein said service channel consists of a bi-directional serial communication link.

31. Information handling system as claimed in claim 30 wherein said serial communication link is compatible with the I²C protocol, and provides a DDC or a DDC/CI communication interface with said processor as well as a I²C communication link between said independent electronic circuit and said at least one display in order to provide to said electronic circuit a direct access to the OSD capability of said at least one display.

32. Information handling system according to claim 30 wherein said electronic circuit is a hardware monitoring circuit for displaying monitoring feedback information to the user via said service channel.

* * * * *